INVENTORS
Felix Saco and
Leonard Rockstrom
BY Thomas W. Y. Clark
ATTORNEY

May 1, 1956 F. SACO ET AL 2,743,879
REWIND MACHINE RIDING ROLLER
Filed Nov. 3, 1953 10 Sheets-Sheet 3
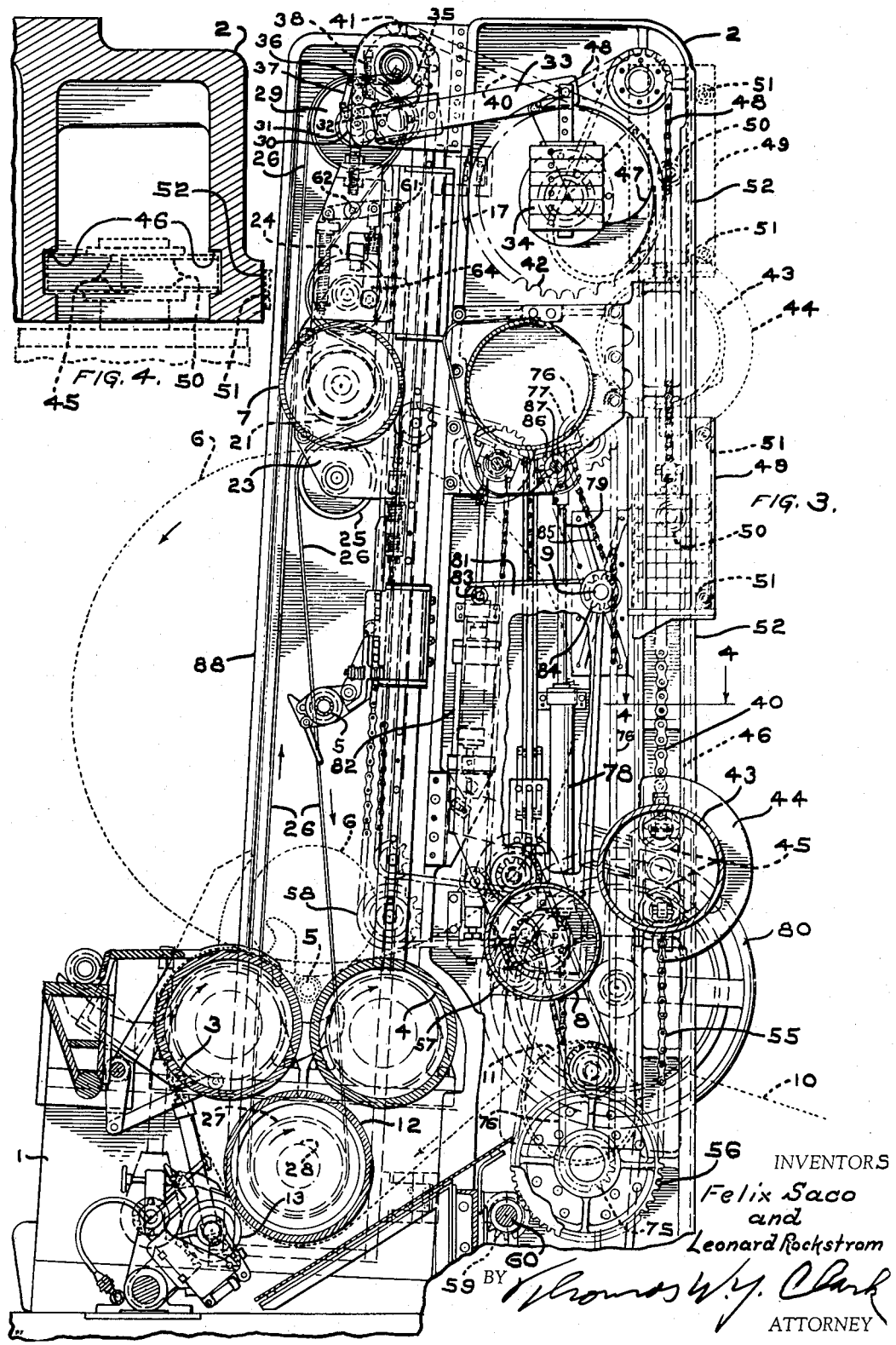
INVENTORS
Felix Saco
and
Leonard Rockstrom
BY Thomas W. J. Clark
ATTORNEY May 1, 1956  F. SACO ET AL  2,743,879
REWIND MACHINE RIDING ROLLER
Filed Nov. 3, 1953  10 Sheets-Sheet 4

INVENTORS
*Felix Saco and
Leonard Rockstrom*
BY
ATTORNEY

May 1, 1956 — F. SACO ET AL — 2,743,879
REWIND MACHINE RIDING ROLLER
Filed Nov. 3, 1953 — 10 Sheets-Sheet 5

INVENTORS
Felix Saco and
Leonard Rockstrom
BY Thomas W. Y. Clark
ATTORNEY

May 1, 1956 F. SACO ET AL 2,743,879
REWIND MACHINE RIDING ROLLER
Filed Nov. 3, 1953 10 Sheets-Sheet 7
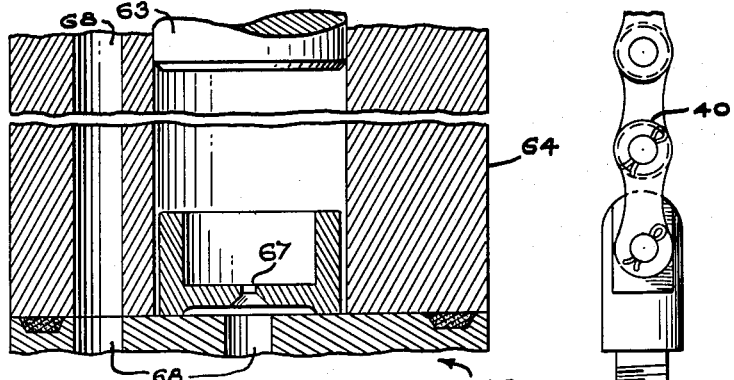
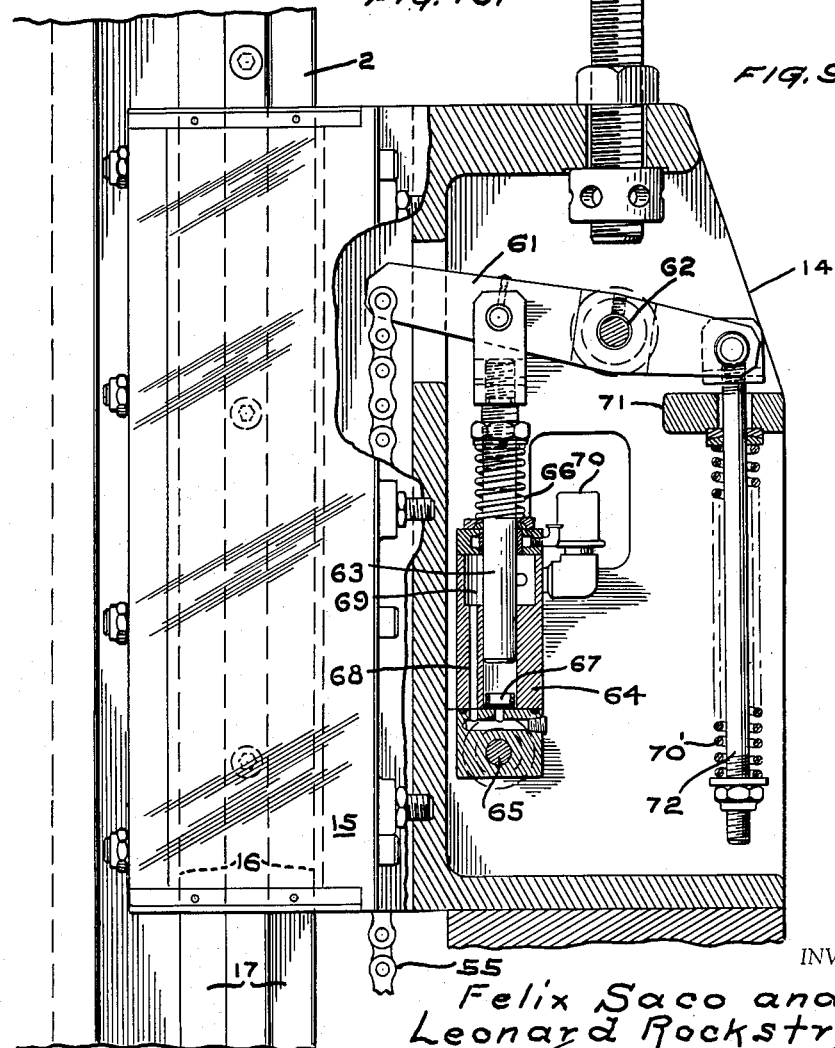
INVENTORS
Felix Saco and
Leonard Rockstrom
BY Thomas W. J. Clark
ATTORNEY

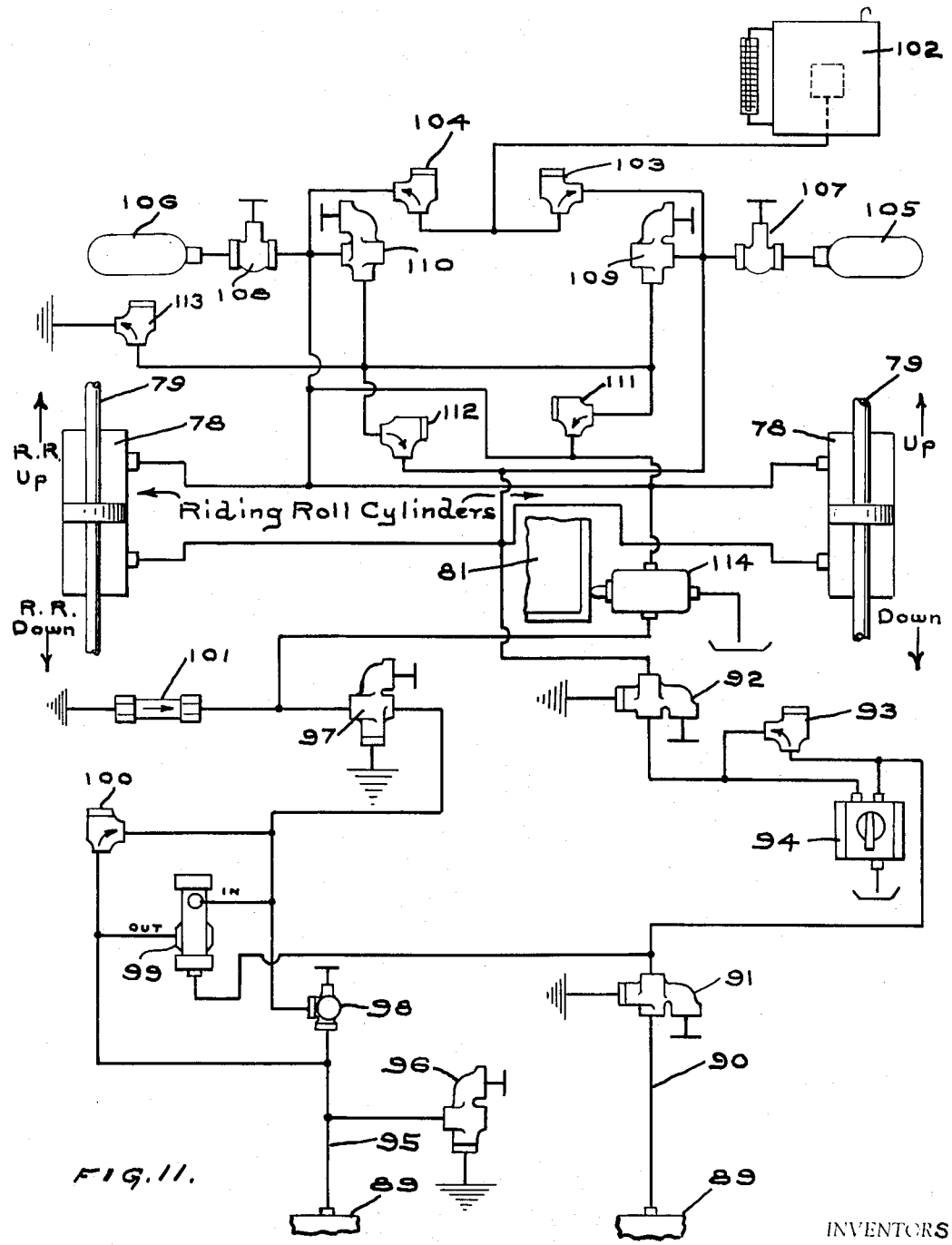

May 1, 1956 F. SACO ET AL 2,743,879
REWIND MACHINE RIDING ROLLER
Filed Nov. 3, 1953 10 Sheets-Sheet 9
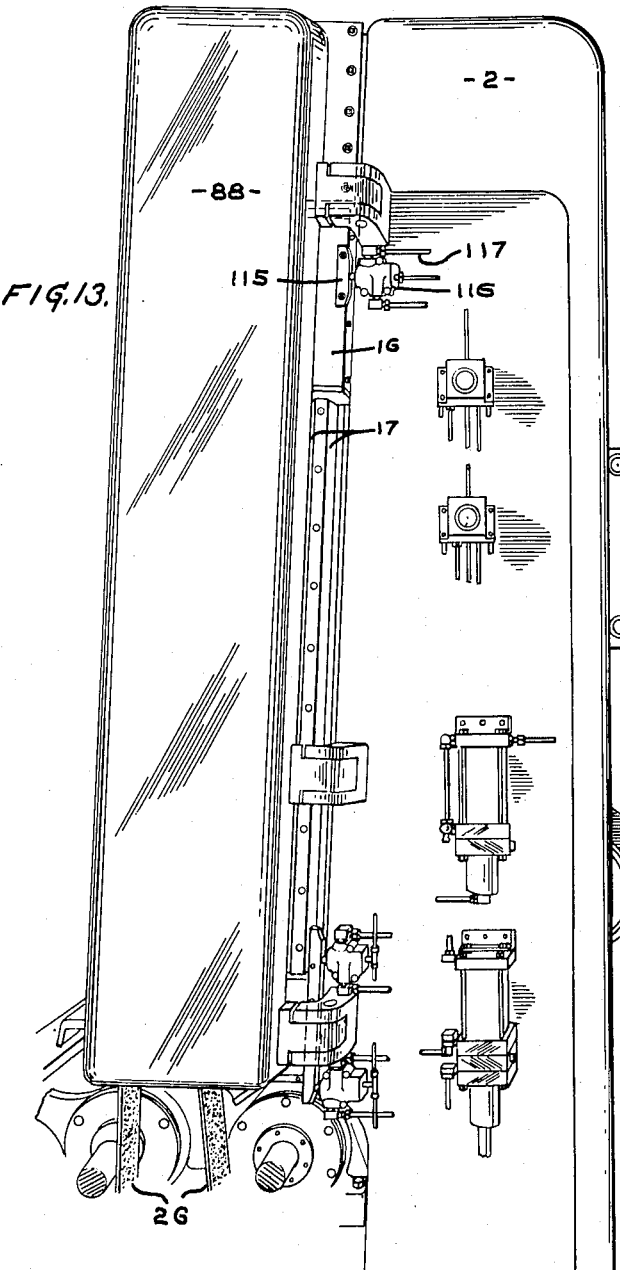
FIG.13.
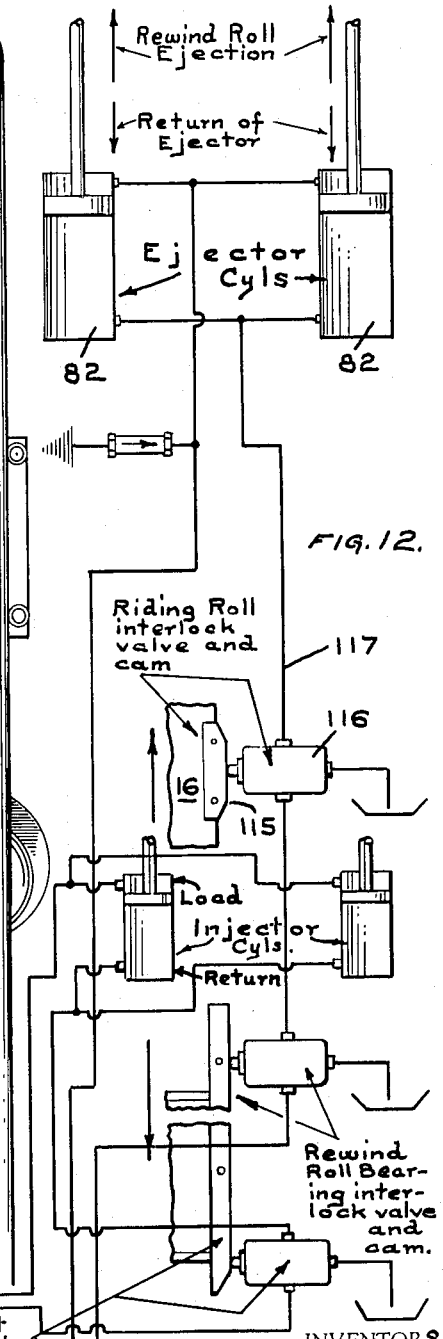
FIG.12.
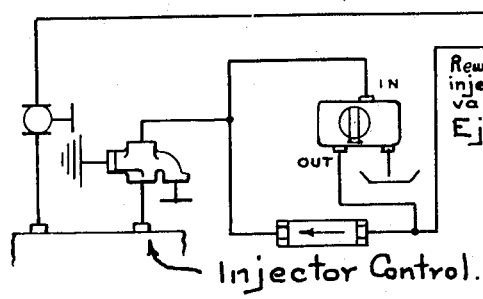
INVENTORS
Felix Saco and
Leonard Rockstrom
BY Thomas W. J. Clark
ATTORNEY

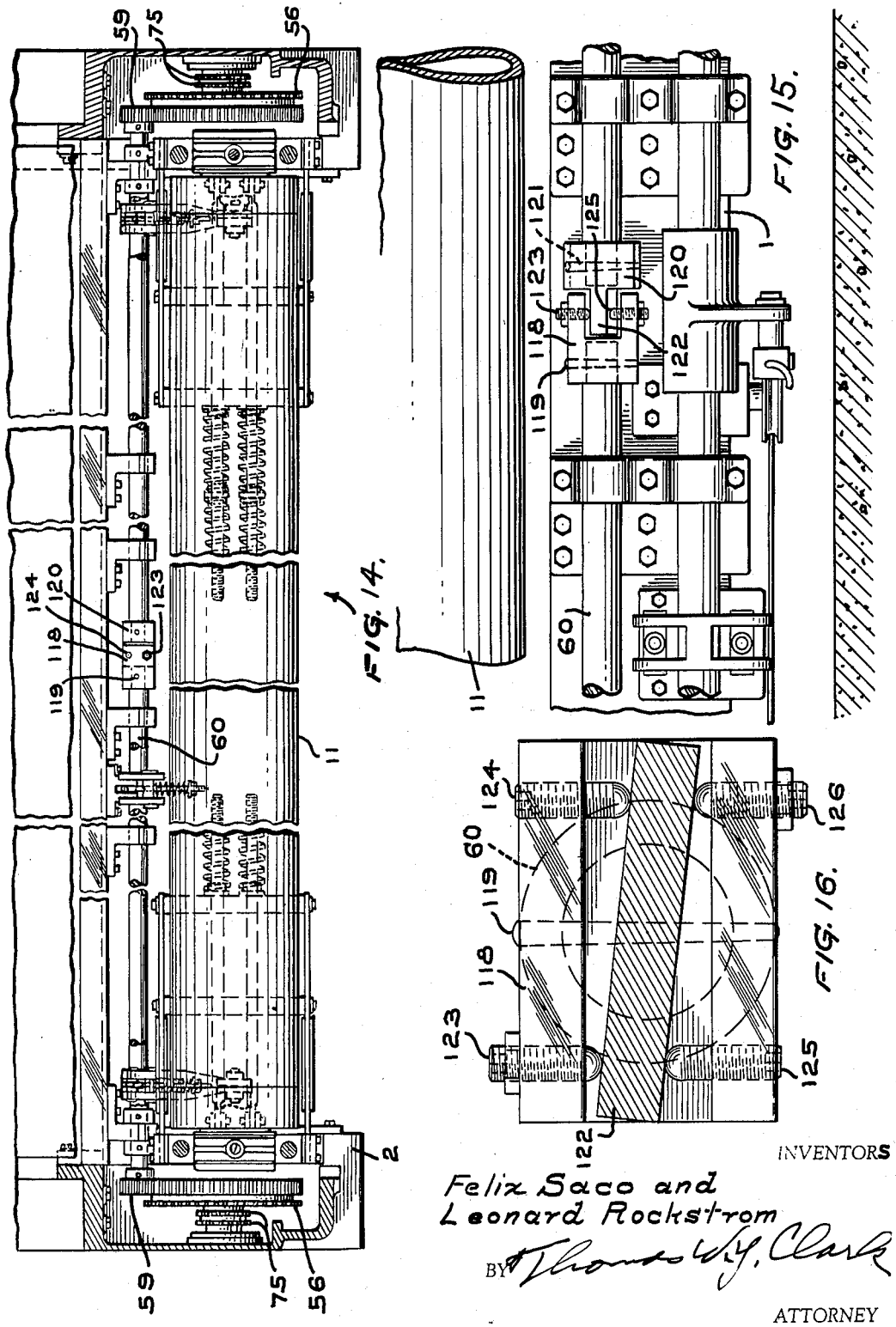

United States Patent Office 2,743,879
Patented May 1, 1956

2,743,879

REWIND MACHINE RIDING ROLLER

Felix Saco, Wantaugh, and Leonard Rockstrom, Manhasset, N. Y., assignors to Cameron Machine Company, Brooklyn, N. Y., a corporation Application November 3, 1953, Serial No. 390,002

19 Claims. (Cl. 242—66)

This invention relates to improvements in the operation of the riding roller of a rewind machine.

Rewind machines have long been used and their primary purpose is to cut the web of the mill roll into narrower widths and then to rewind the cut web. With the increasing capacity of paper making machines the mill rolls have become increasingly large and the rewinding machines have consequently become increasingly large and increasingly fast in their operation.

The rolls of paper or other material, after slitting, are wound about a rewind shaft which is supported between two horizontal driven drums which rotate the rewind roll to wind the material upon it. The rewind roll has a riding roller bearing upon it from the top to assure the evenness and tightness of the winding. The riding roller is preferably driven slightly faster than the rolls supporting the rewind roll in order to assure a tight start and that the rewind roll will not drive it, thereby impeding the winding operation. When the rewind roll is relatively small it is desired to have the pressure on the riding roller substantially greater than when the rewind roll becomes large in order to equalize the tension on the fibers in the web in the rewind roll throughout the radius of the roll. It is, of course, well known that many materials are very thin and are subject to tearing and stress to a greater extent than more thick or heavy materials which require greater pressure upon them to make them wind into solid rolls. For these reasons it is necessary to have the pressure on the rewind roll variable and variable within very close limitations and it is also both desirable and necessary to have that pressure variable as the rewind roll becomes larger. In the present invention the pressure on the riding roller is varied both by the more conventional cam supported weights and also by the use of a hydraulic cylinder which is used both to vary the pressure on the riding roller as well as to raise or lower it as desired.

It has been well known that uneven portions of paper as it comes from the mill roll impart uneven sections to the rewind roll to make it bumpy in places and sometimes to make one end larger than the other. It is among the objects of the invention to minimize this bumpiness in the paper so that it is not reflected in an uneven rewound roll, that is the bumpiness or lumps in the rewound roll are ironed out by the riding roll. Should the rewound roll take a conical shape because of a continued unevenness toward one end, although the riding roller is allowed to tilt to accommodate its pressure to this condition, it is placed under constant pressure to restore the rewound roll to a true cylinder. Also uneven portions of the rewound roll tend to impart a bouncing action to the riding roller and to continue the uneven winding, and the instant invention provides means to avoid the bouncing and not only to prevent a continuance of the uneven winding of the rewound roll but to iron out these lumps that produce this bouncing.

The above and other objects and advantages of the invention will be apparent from the following description and the accompanying drawing in which:

Figure 3 is a transverse sectional view of the machine.

Figure 4 is a fragmentary sectional view on line 4—4 of Figure 3.

Figure 9 is a side elevation partly in section of the snubbers in the carriage of the riding roller.

Figure 10 is an enlarged sectional view of the lower portion of the snubber cylinder.

Figure 11 is a diagrammatic view of the hydraulic circuit for the riding roller of the rewinding machine.

Figure 12 is a diagrammatic view of the circuit of the interlock between the riding roller and the rewound roll ejector.

Figure 13 is an end elevation showing the location of the cams to operate the interlock between the riding roller movements and the rewound roll ejector.

Figure 14 is a horizontal sectional view of the rear part of the machine showing the synchronizing shaft.

Figure 15 is a fragmentary elevational view of the synchronizing shaft.

Figure 16 is a transverse sectional view of the connection between the sections of the synchronizing shaft.

In the drawings similar numerals refer to similar parts throughout the several views.

Figure 1:
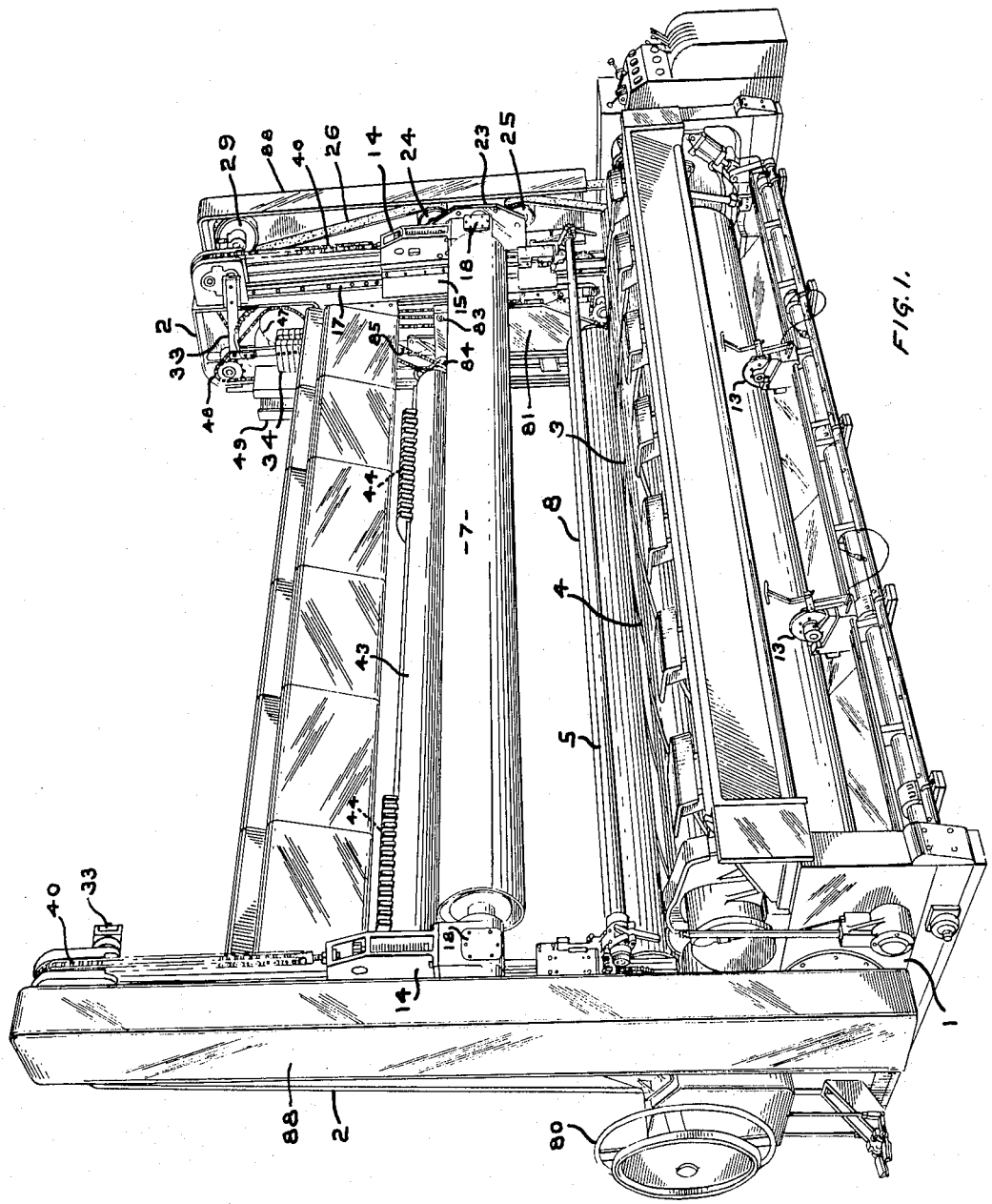
Figure 1 is a front elevational view of the rewinding machine.
Figure 2:
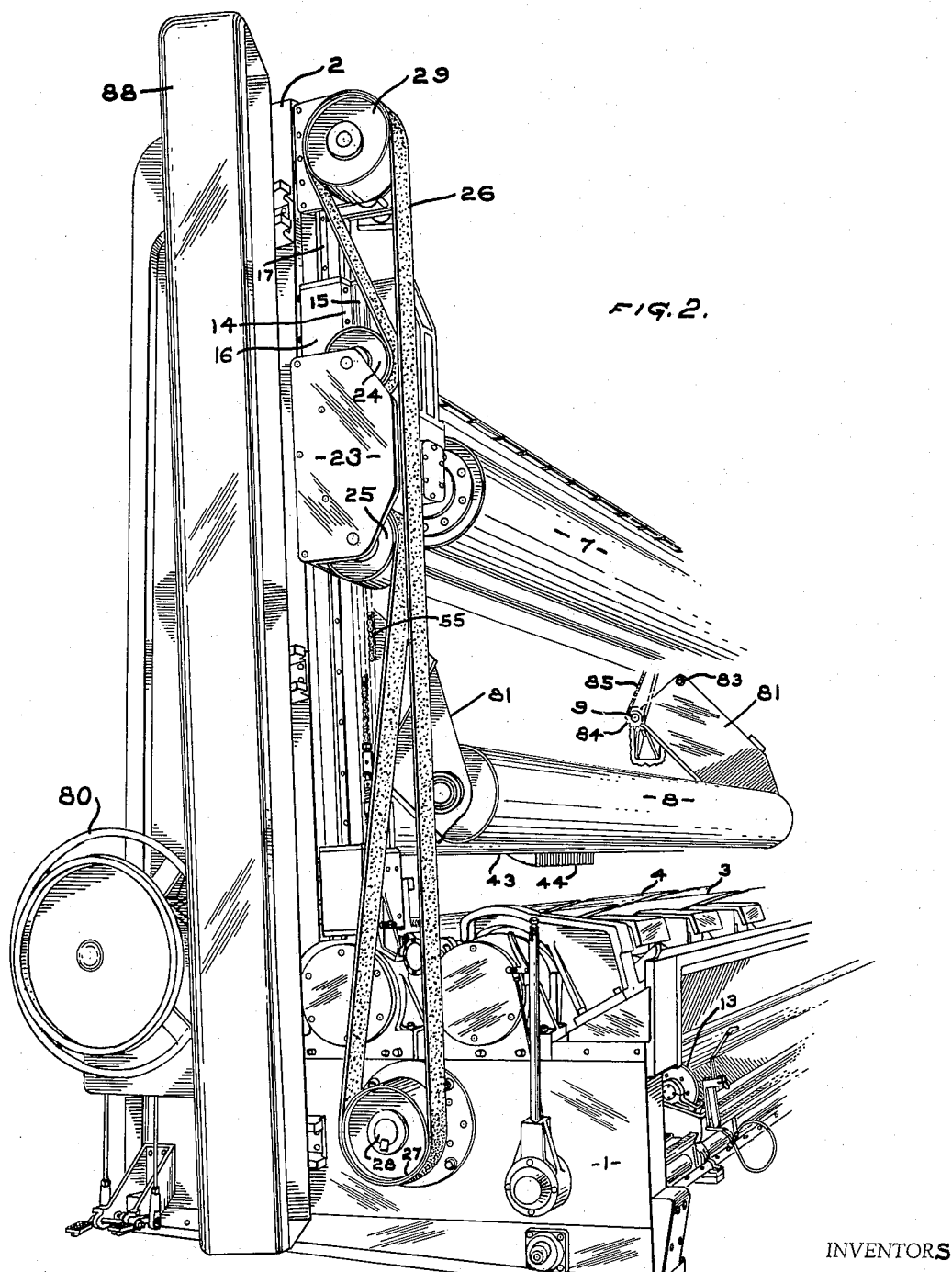
Figure 2 is an end elevational view of the rewinding machine with the cover removed showing the drive for the riding roller.
Figure 5:
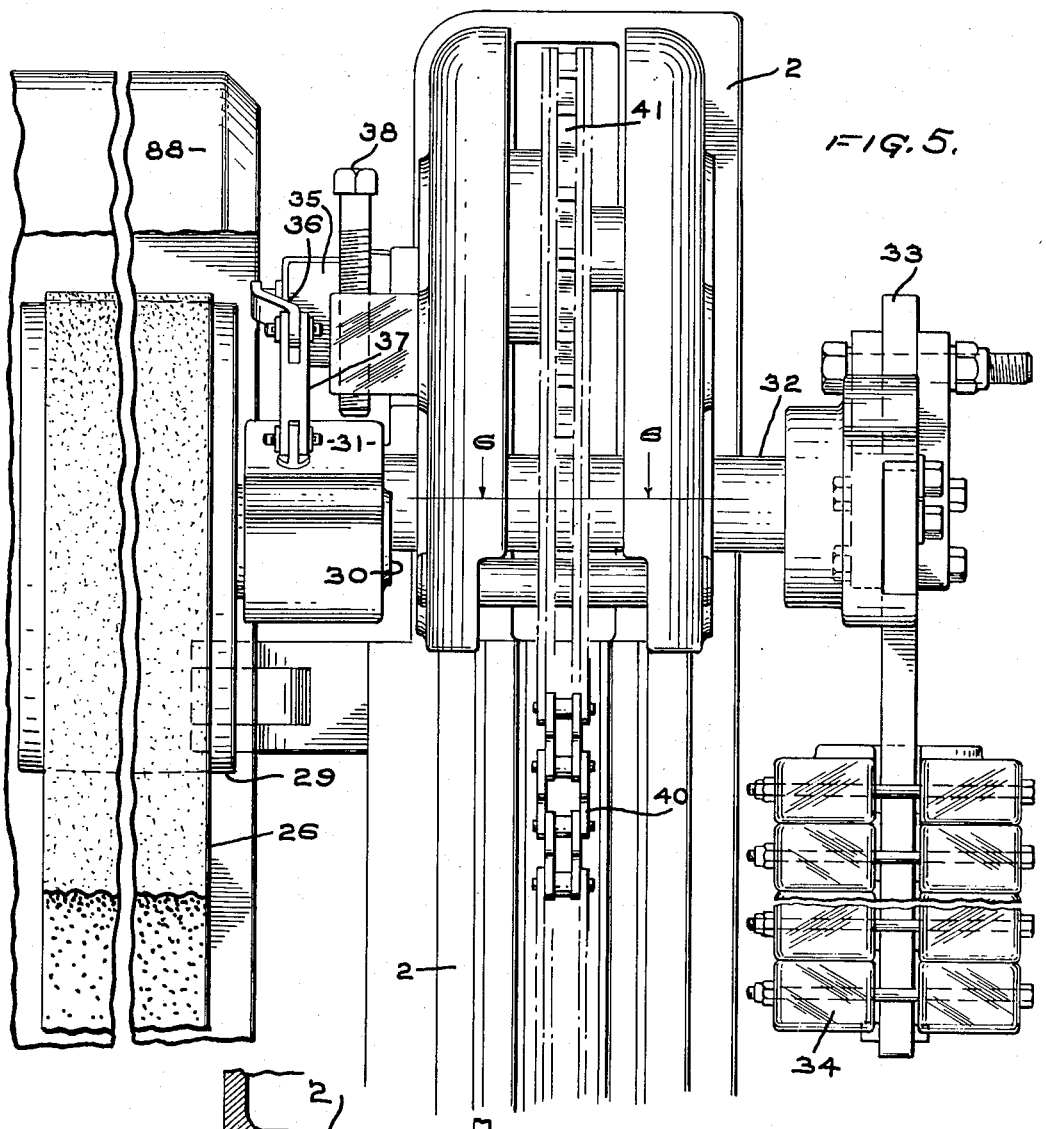
Figure 5 is a front fragmentary elevation of the support for the riding roller and its drive.
Figure 6:
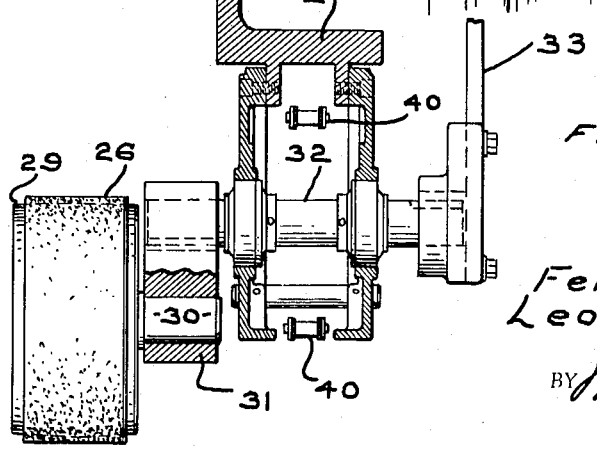
Figure 6 is a sectional view on line 6—6 of Figure 5.
Figure 7:
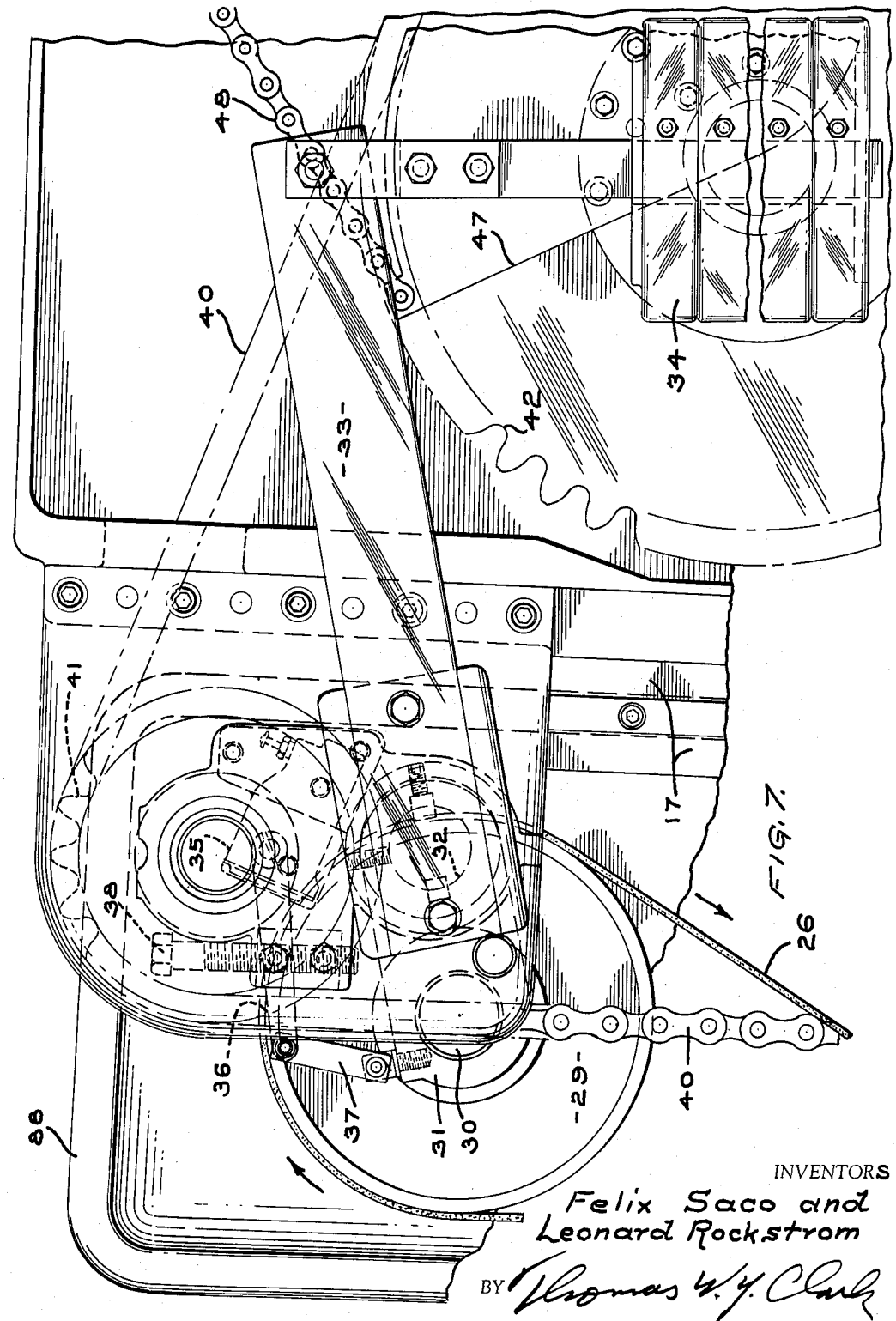
Figure 7 is a side elevational view on the top of the support for the riding roller and its drive.
Figure 8:
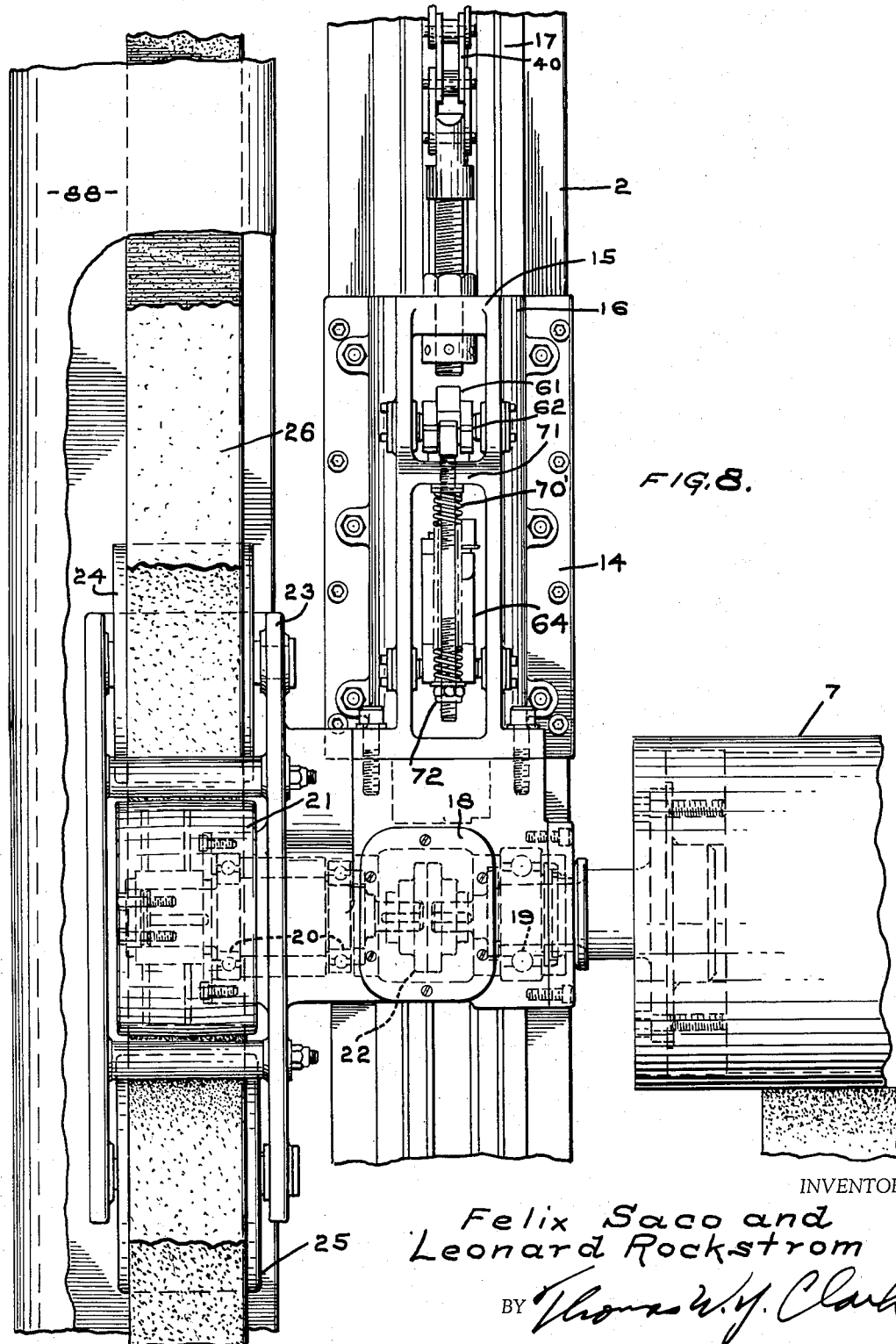
Figure 8 is a front elevation partly in section of the carriage for one end of the riding roller.

The rewinding machine has a base 1 and side frames 2. In the base 1 are mounted supporting drums 3 and 4. Rewind shaft 5 receives upon it the web or paper to be wound into the rewound roll 6. The pressure or riding roller 7 bears upon the rewound roll 6 to regulate its solidity and evenness. An ejector roll 8 is pivoted at 9 to swing outwardly and push the rewound roll from the supporting drums.

The web of paper 10 enters the rewinding machine by passing over compensating roll 11 under cutter platen roll 12 on which it is slit by cutters 13 after which it passes around front drum 3 and back to rear drum 4 and between these rolls rests rewind shaft 5, around which the material is wound.

The riding roller 7 is supported in the lower sections of the carriages 14, each having on the rear of its upper sections a U-shaped member 15, both legs of which members have clamps 16 riding on ways 17 on the sides of the side frames 2. These ways hold the carriages 14 to allow their movement in a straight path, which as shown in Figure 3 is substantially vertical, sloping slightly toward the rear at the top. The lower section of each carriage 14 is a housing 18 which supports bearings 19 on which roller 7 is mounted, and 20 on which pulley 21 is mounted and flexible coupling 22 connecting the shafts of pulleys 21 and roller 7, thus allowing considerable tilting of roller 7 by an uneven rewound roll. From the outside of each housing 18 projects the mounting 23 for the two rollers 24 and 25 around which belt 26 passes and by which that belt is guided around pulley 21 to drive the riding roller 7 during all of its vertical movement. The direction of the belt is downward in its driving operation, to give the greatest steadying effect on the riding roller drive, especially in starting. Belt 26 passes around lower pulley 27 mounted on shaft 28 which is connected to the main drive of the machine and extends from each end of the machine so that both belts 26 may be driven from it. The upper pulley 29 for belt 26 rotates about the shaft 30 mounted in bracket 31 keyed to shaft 32 mounted in bearings on the front of side frames 2. On the other end of shaft 32 is mounted lever 33 which is likewise keyed to the shaft 32 and to the other end of this lever 33 are swung a plurality of U-shaped counterweights 34 which are bolted in position. The movements downward of shaft 30 are snubbed or dampened by check member 35, acting like a door check through means of its connections thereto by lever and link 36 and 37. A jack screw 38 limits the upward movement of bracket 31 when the belt is removed for any purpose. By means of this construction tension may be placed on belt 26 which is adequate to rotate riding roller 7 without slippage and any unusual interruption to the even rotation of the riding roller, or of drive belt 26, in stopping and starting, or its vertical movement, is dampened by means of the check 35, this check being in the nature of a door check of old construction. This prevents jerking or uneven stopping or starting of the drive of the riding roller, thus preventing uneven winding of the web.

Carriages 14 are supported in their vertical position by means of chains 40 which at the front pass over upper idlers 41 and then over rear idlers 42. At the other end of the heavy sections of chain 40 is attached the counterweight tube 43. This counterweight tube 43 may be provided with sectional conuterweights 44 in any desired number to counterweight the desired portion of the weight of the riding roller and its carriages, and may be termed the fixed counterweight.

Tube counterweight 43 is mounted at each end in a frame riding on rolls 45 which roll in ways 46 formed on the inside of the rear edges of the frame sections 2.

Idlers 42 also have attached thereto and rotating therewith cams 47 to which are attached chains 48 which carry cages 49 riding on rolls 50 in the rear slot 46 on the side frames, and rolls 51 on the way 52 on the outside of the rear side frames 2. These cages 50 have therein counterweights of any desired number. The cam 47 is so positioned as to place the maximum weight of the riding roller upon the rewind roll at the beginning of the rewinding operation and as the rewind roll increases in size, the cam rotates and relieves the rewound roll of a large portion of the weight of the riding roller, the counterweights in cages 50 counter-balancing most of the weight originally given to the riding roller to provide for the desired tightness of the winding of the rewinding roll at the beginning of its operation.

The riding roller carriages 14 and the fixed counterweight 43 have connected to them at their lower sides a continuation of chain 40 in the form of a lighter chain 55 so that the carriages supporting the riding roller and the counterweight tube 43 are connected together by endless chains in a closed circuit or path. The lower reaches of chains 55 go around sprockets 56 then up to idlers 57 then forward to idlers 58. Gears connected to sprockets 56 mesh with pinions 59 fixedly connected to synchronizing bar or shaft 60 which extends across the machine between the respective pinions 59 on each side so that the shaft 60 tends to maintain the sprockets 56 in their originally set relationship to maintain the riding roller horiontal, parallel with the supporting drums 3 and 4. This horizontal position is most desirable to prevent interweaving of the slitted webs.

Each chain 55 is connected to the respective carriage 14 by its connection to the long arm of the lever 61 pivoted at 62 in carriage 14. Lever 61 has pivoted on the same long arm, the piston 63 operating in cylinder 64 pivoted at 65 to carriage 14. The piston has compression spring 66 around it above the cylinder 64 to always maintain the piston up in the usual operation of the rewinder. The cylinder 64 has therein a displaceable valve 67 through which oil is passed through its center orifice, when an unusual force is exerted through the riding roller to push it upward. The small orifice allows the oil to go through it slowly and under pressure because of this unusual movement of the riding roller. The oil flows backward through the passages 68 to the reservoir 69 which is kept replenished by the supply 70. Upon the release of the unusual pressure on the riding roller the spring 66 rapidly restores the piston to normal, the oil flows freely through the passages 68 and around the valve 67 which is raised in this operation by the flowing of the oil. This spring weighted piston and cylinder give a snubbing action with a quick return to any unusual movements of the riding roller.

Also on lever 61 is the heavier compression spring 70' extending between mounting 71 on the carriage 14 and the end of rod 72 pivotally connected to lever 61. These springs 70' not only supplement the springs 66 but are so strong as to add considerable to the downward force of the riding roller when it is pushed or tilted out of line by an unwanted condition in the paper being rewound. The springs are so strong as not only to tend to resist any tilting of the riding roll but to strongly continue to restore the riding roller to horizontal position. The springs can be so tightened in their supports as to maintain the riding roller parallel with the supporting rolls, but in practice they are used to restore the rewound roll to a true cylinder. Either end of the riding roller may rise without the other and by the action of the spring, be restored to horizontal position, or bumps may appear on the rewound roll, and by the action of the springs, they may be smoothed out. Without the springs and snubbers, the bumps increase.

Sprockets 56 have smaller sprockets 75 rigid with their axes around which pass chains 76, the upper runs of which are mounted on idlers 77. Double acting hydraulic cylinders 78 on each side of the machine have pistons on piston rods 79 therein, the piston rods 79 forming part of the circuits or paths of chains 76, that is, being connected thereto at both ends and the hydraulic cylinders work on the pistons in both directions to raise or lower the pistons and consequently to rotate the sprockets 56 and to thereby raise and lower the riding roller. These hydraulic cylinders 78 are useful not only to raise and lower the riding roller but to apply any desired pressure thereto under the hydraulic pressure imparted to the cylinders 78. It will be seen that the hydraulic cylinders 78 also serve as snubbers or dampeners to any unusual movement of the riding roller, in combination with the snubber cylinders 64.

The riding roller may also be manually raised by hand wheel 80 which is geared by releaseable means, old in the art, to sprocket 56. The riding roller lowers by gravity in the event the hydraulic system is not operating.

The ejector roll 8 is mounted on brackets 81 pivoted at 9 and is moved forward or backward by means of hydraulic cylinders 82, the ends of the piston rods of which are directly connected to the brackets 81 at 83. The brackets 81 also have on them at their pivot points 9 pinions 84 around which pass chains 85. These chains also pass around pinions 86 on synchronizing shaft 87 which extends from side to side of the machine to assure that the movement of the ejector roll 8 is always parallel with the other rolls of the machine, in its ejecting operation.

Covers 88 enclose the riding roller drive means.

Hydraulic pressure is supplied to the rewinder by a pump not shown, which supplies oil from the tank 89. Oil under pressure is admitted to line 90 by a valve and lever on the operating panel, not shown, to raise the riding roller by the admission of oil to the lower part of the hydraulic cylinders 78, the oil returning from the top of the cylinders to the tank at the same time.

On the way to the cylinders, the oil passes through pressure relief valves 91, 92 bypassing through check valve 93, the flow control valve 94 by which to set the rate of lowering of the riding roller, at the time of the reverse flowing of the oil.

When the riding roller is to be lowered, oil under pressure is admitted by a valve and lever on the panel, not shown, through line 95, past relief valves 96 and 97 and needle valve 98, which controls the rate of reverse flow during rewinding, it can be set to increase or decrease the riding roller pressure when raising the riding roller during rewinding.

Pilot operated check valve 99 is used to by-pass the needle valve 98 when raising the riding roller other than during the winding operation. Check valve 100 allows oil to by-pass the needle valve 98 during lowering of the riding roller.

Check valve 101 allows additional oil under pressure to be introduced to the line from the tank.

Reservoir 102 supplies additional oil when needed for surges in the riding roller system. 103 and 104 are check valves to isolate the reservoir during normal operation. 105 and 106 are accumulators to absorb normal pressures due to system surges which are not relieved by the pressure relief valves and 107 and 108 are gate valves to isolate the accumulators when desired. 109 and 110 are the main pressure relief valves for the system and 111 and 112 are check valves to permit balancing of the raising and lowering systems during surging, while 113 is a check valve to release oil from the complete system in the event of an excess supply from reservoir 102.

Safety interlock valve 114 is operated by bracket 81 of the roll ejector, and the withdrawn ejector maintains the riding roller raising line open by its contact with the operator of valve 114.

As shown in Figures 12 and 13, the rewound roll ejecting roll 8, operated by cylinders 82, is interlocked with the position of the riding roller 7. One of the brackets 16 which guides the riding roller on the machine side frames, has a cam 115 thereon, which, only when the riding roller is up, keeps the valve 116 in line 117 open to admit hydraulic pressure to the bottoms of the cylinders 82 to raise their pistons and to move the ejector roll 8 forward.

It is preferable that the synchronizing shaft 60 be divided substantially near its center so that the position of the two ends may be readily adjusted relatively to each other. This divided connection is illustrated in Figures 14, 15 and 16. On one section of shaft 60 is a yoke 118 which is attached to the shaft 60 by pin 119. On the other section of shaft 60 is a plate member 120 attached by a pin 121 to the shaft. The plate or tongue 122 is held in the desired relative rotational position of yoke 118 by means of the set screws 123, 124, 125 and 126.

After the machine has been set up, it is imperative that the riding roller 7 be horizontal and parallel with the supporting drums 3 and 4 while synchronizing shaft 60 is free of any torque or twisting moment. Should there be any twisting effect in the synchronizing shaft with this horizontal and parallel relationship realized, that twisting effect is removed or relieved by the proper setting of the set screws 123 to 126. After this proper setting is obtained, the synchronizing shaft then serves its function completely of tending to level the riding roller at any time it is thrown out of this level or horizontal position by the web.

Having described the invention with reference to the preferred embodiment thereof, it will be understood that changes and modifications may be made without departing from the spirit and scope of the invention.

What is claimed as new and is desired to be secured by Letters Patent is:

1. A web roll winding machine including a top pressure roller displaceable by the accumulation of wound material, endless means connected to said roller at each end and travelling in similar paths to support and raise and lower said roller, counterweights connected to said endless means within their paths to balance the weight of said roller, and means to hold said endless means in tension to restrain movements of the roller independently of movement of the endless means.

2. A web roll winding machine including a top pressure roller displaceable by the accumulation of wound material, endless means connected to said roller at each end and travelling in similar paths to support and raise and lower said roller, counterweights connected to said endless means within their paths to balance the weight of said roller, said endless means each having a roller and counterweight supporting section and roller restraining sections and resilient means within the restraining sections of both said endless means to enlarge either endless means upon the tilting of the roller by an unevenly wound roll, said resilient means contributing pressure to the roller to restore the roll to a true cylinder.

3. A web roll winding machine including a top pressure roller displaceable by the accumulation of wound material, endless means connected to said roller at each end and travelling in similar paths to support and raise and lower said roller, counterweights connected to said endless means within their paths to balance the weight of said roller, and separate drive means connected each to said endless means to move said roller vertically and means to maintain the movements of the two endless means substantially in unison.

4. A web roll winding machine including a top pressure roller displaceable by the accumulation of wound material, endless means connected to said roller at each end and travelling in similar paths to support and raise and lower said roller, counterweights connected to said endless means within their paths to balance the weight of said roller, and a synchronizing shaft extending across the machine connected to each endless means to substantially coordinate the movements of each with the other.

5. A web roll winding machine including a top pressure roller displaceable by the accumulation of wound material, endless means connected to said roller at each end and travelling in similar paths to support and raise and lower said roller, counterweights connected to said endless means within their paths to balance the weight of said roller, and flexible drive means connected to the roller at each end thereof to rotate the same.

6. A web roll winding machine including upstanding frame sections at each end, a top pressure roller displaceable by the accumulation of wound material, carriages having drive means therein sliding vertically on each said frame section, means within each carriage flexibly connecting the roller to said drive means to allow for the tilting of the roller, endless means in each frame section connected to said carriages and travelling in similar paths to support and raise and lower the roller and counterweights connected to said endless means to balance the weight of the roller.

7. The winding machine of claim 6 in which each said endless means has a roller and counterweights supporting section and a roller restraining section and resilient means within the restraining sections of both said endless means, to enlarge either endless means upon the tilting of the roller by an unevenly wound roll, said resilient means contributing pressure to the roller to restore the roll to a true cylinder.

8. The winding machine of claim 6 including a synchronizing shaft extending across the machine connected to each endless means to substantially coordinate the movements of each with the other.

9. A web roll winding machine including upstanding frame sections at each end, a top pressure roller displaceable by the accumulation of wound material, carriages sliding vertically on each frame section, central and upper and lower pulleys in each carriage, a drive belt on each frame section passing between the pulleys and driving the central pulley in any vertical position, means within each carriage flexibly connecting the roller between said central pulleys to allow for the tilting of the roller and endless means in each frame section connected to said carriages and travelling in similar paths to support and raise and lower the roller and counterweights connected to said endless means to balance the weight of the roller.

10. A web roll winding machine including upstanding end sections, a top pressure roller displaceable by the accumulation of wound material, endless driving means connected to said roller at each end to rotate the same, and having an upper loop passing above the roller, endless support means connected to said roller at each end to raise and lower the roller, all said endless means being supported in said end sections, counterweights connected to said endless support means to balance the weight of the roller, a tensioned snubber controlled support in said sections for the upper loop of the endess driving means, and means to hold the endless support means in tension to restrain movement of the roller independently of the endless support means.

11. The winding machine of claim 10 including a synchronizing shaft extending across the machine connected to each endless support means to substantially coordinate the movements of each with the other.

12. A web roll winding machine including a top pressure roller displaceable by the accumulation of wound material, driving means connected to said roller at each end to rotate the same, flexible connections between the drive means and the roller at each end to maintain pressure of the roller upon its tilting on an out of round web roll, endless support means connected to said roller at each end to raise and lower the roller, counterweights connected to said endless support means to balance the weight of the roller, gears around which said endless support means pass, and drive means connected to one said gear on each side of the machine to vertically move the roller.

13. A web roll winding machine including a top pressure roller displaceable by the accumulation of wound material, driving means connected to said roller at each end to rotate the same, endless support means connected to said roller at each end to raise and lower the roller, counterweights connected to said endless support means to balance the weight of the roller, gears around which said endless support means pass, and endless drive means including a double acting hydraulic cylinder within its path connected to one said gear on each side of the machine, to vertically move the roller.

14. A web roll winding machine including a top pressure roller displaceable by the accumulation of wound material, driving means connected to said roller at each end to rotate the same, endless support means connected to said roller at each end to raise and lower the roller, counterweights connected to said endless support means to balance the weight of the roller, gears around which said endless support means pass, and hydraulic means connected to one said gear on each side of the machine to supplement or counteract the weight of the counterweight with any selected pressure.

15. A web roll winding machine including a top pressure roller displaceable by the accumulation of wound material, driving means connected to said roller at each end to rotate the same, endless support means connected to said roller at each end to raise and lower the roller, counterweights connected to said endless support means to balance the weight of the roller, gears around which said endless support means pass, hydraulic cylinders connected to one said gear on each side of the machine to vertically move the roller and a synchronizing shaft connected to said endless support means to substantially coordinate the movement of each endless support means with the other.

16. A web roll winding machine including a top pressure roller displaceable by the accumulation of wound material, driving means connected to said roller at each end to rotate the same, flexible means between said driving means and roller at each end of the roller, to allow for the tilting of the roller, to accommodate the roller position to non-cylindrical wound material, endless support means connected to said roller at each end to raise and lower the roller, counterweights connected to said endless support means to balance the weight of the roller, gears around which said endless support means pass, hydraulic cylinders connected to one said gear on each side of the machine to vertically move the roller and a synchronizing shaft connected to said endless support means to substantially coordinate the movements of each endless support means with the other.

17. A web roll winding machine including a top pressure roller displaceable by the accumulation of wound material, endless means connected to said roller at each end and travelling in similar paths to support and raise and lower said roller, counterweights connected to said endless means within their paths to balance the weight of said roller, and hydraulic means connected to each said endless means to apply a predetermined vertical pressure to the said roller.

18. A web roll winding machine including a top pressure roller displaceable by the accumulation of wound material, endless means connected to said roller at each end and travelling in similar paths to support and raise and lower said roller, counterweights connected to said endless means within their paths to balance the weight of said roller, and snubbers connecting said endless means within both said paths to dampen upward movement of said roller upon impact with an unevenly wound roll.

19. A web roll winding machine including a top pressure roller displaceable by the accumulation of wound material, endless means connected to said roller at each end and travelling in similar paths to support and raise and lower said roller, counterweights connected to said endless means within their paths to balance the weight of said roller, snubbers connecting said endless means within both said paths to dampen upward movement of said roller upon impact with an unevenly wound roll and resilient means connected to said snubbers to apply continuous pressure to the roller to restore the roll to a round perimeter.

References Cited in the file of this patent

UNITED STATES PATENTS

| | | |
|---|---|---|
| 1,967,922 | Cameron | July 24, 1934 |
| 2,012,118 | Cameron | Aug. 20, 1935 |
| 2,357,202 | Hornbostel | Aug. 29, 1944 |
| 2,596,208 | Carter | May 13, 1952 |
| 2,609,157 | Asmussen et al. | Sept. 2, 1952 |
| 2,654,546 | Hornbostel | Oct. 6, 1953 |